(12) United States Patent
Padgett

(10) Patent No.: US 11,369,101 B1
(45) Date of Patent: Jun. 28, 2022

(54) WATER DELIVERY TO A LIVE BAIT WELL

(71) Applicant: Michael Padgett, Miami, FL (US)

(72) Inventor: Michael Padgett, Miami, FL (US)

(*) Notice: Subject to any disclaimer, the term of this patent is extended or adjusted under 35 U.S.C. 154(b) by 53 days.

(21) Appl. No.: 16/790,405

(22) Filed: Feb. 13, 2020

(51) Int. Cl.
*A01K 97/05* (2006.01)
*B63B 35/26* (2006.01)

(52) U.S. Cl.
CPC .............. *A01K 97/05* (2013.01); *B63B 35/26* (2013.01)

(58) Field of Classification Search
CPC ................................ A01K 97/05; B63B 35/26
See application file for complete search history.

(56) References Cited

U.S. PATENT DOCUMENTS

| | | | |
|---|---|---|---|
| D252,685 S | 8/1979 | Johnston | |
| 5,538,406 A * | 7/1996 | Siegal | F04D 29/086 417/360 |
| D404,400 S | 1/1999 | Wang | |
| 6,038,993 A * | 3/2000 | Vento | A01K 97/05 114/255 |
| 6,276,908 B1 * | 8/2001 | Batchelder | F04D 13/06 417/360 |
| 6,699,087 B1 * | 3/2004 | Tafoya | B63H 21/383 440/88 C |
| 2006/0070581 A1 * | 4/2006 | Kohlmoos | A01K 63/06 119/265 |
| 2016/0108903 A1 | 4/2016 | Cai et al. | |
| 2018/0010609 A1 | 1/2018 | Jensen et al. | |
| 2018/0045208 A1 | 2/2018 | Bedin et al. | |

OTHER PUBLICATIONS

Dave Lear, Keep your Bait Healthy with a Sea Chest, Jun. 1, 2015, https://www.saltwatersportsman.com/keep-your-bait-healthy-sea-chest/ (Year: 2015).*
Hooker Electric, 39' Contender w/ Hooker electric pumps, Jan. 14, 2019, https://www.youtube.com/watch?v=Nvf8R8D-Nlo (Year: 2019).*

* cited by examiner

*Primary Examiner* — Monica L Barlow
*Assistant Examiner* — Madeline L Douglas
(74) *Attorney, Agent, or Firm* — Malloy & Malloy, PL

(57) ABSTRACT

The delivery of water to a live well on a marine craft includes a sea chest disposed in fluid communication with ambient water and the live well. An access opening is formed on the sea chest in communication with an interior thereof. A cover is removably connected in fluid sealing relation to the access opening. Each of one or more pumps is connected to an exterior of the sea chest and includes a housing having an open segment disposed in accessible relation to the housing interior and internal workings therein. A mounting structure adjustably connects an inlet of the housing in fluid communication with a submerged, lower interior of the sea chest and an outlet is connected in fluid delivering relation to the live well.

20 Claims, 16 Drawing Sheets

WATER DELIVERY TO A LIVE BAIT WELL

BACKGROUND OF THE INVENTION

Field of the Invention

An assembly for delivering water to a live bait well on a marine craft comprising a sea chest mounted on the marine craft and disposed in fluid communication with both ambient water and the live well. One or more pumps are removably interconnected between and at least partially define a path of fluid flow from the sea chest to the live well.

DESCRIPTION OF THE RELATED ART

The use of live bait wells is common practice in Marine craft associated with both commercial fishing as well as sport fishing, including tournament fishing. As recognized, live bait wells are used to maintain and make readily available live bait fish. Therefore, when different types of marine craft are involved in commercial or sport fishing, it is common practice to utilize live bait fish.

In order to keep such baitfish alive and in good condition for many hours, it is common to employ a continuous delivery or pumping of ambient water from outside the boat to the bait well containing the live bait. The purpose of such continuous water delivery is to replace water as the oxygen is being depleted by the contained baitfish within the live well. Further, as practically utilized the overflow of water, supplied to the interior of the live well may be discharged therefrom using a variety of different types of overflow or discharge techniques and/or equipment.

Basic operating procedures of a system for delivering ambient water to the interior of the live bait well involves the use of a pump interposed between the supply of ambient water, on which the watercraft travels and the interior of the live well itself. However, recognized problems and disadvantages with water delivery systems of the type set forth above may include the clogging or fouling of the pump motor, pump impeller, etc. by debris such as seaweed, seagrass or other types of debris. In order to overcome such problems it is also known to incorporate the use of a "sea chest" disposed and structured to initially receive ambient water prior to reaching a pump, which then creates a forced flow of ambient water from the sea chest to the interior of the live bait well.

While assumed to be at least operative, known water delivery systems encounter significant problems or disadvantages primarily, but not exclusively, relating to the overall operative and structural features of such systems. Such disadvantages include, but are not limited to, airlock of the water delivery pump, clogging of the pump with debris even when utilized in combination with a sea chest, and a failure in part or in whole of the entire delivery system resulting in a failure to maintain the bait alive and in a viable condition. Further, in many situations such as, but not limited to tournaments sport fishing is imperative to maintain the water delivery system operative at all times. This is especially true since tournament sport fishing is conducted within certain strict time guidelines. Therefore, a failure of the live bait well and/or the water delivery system thereto will result in contestants in tournament fishing losing valuable time when repair or replacement of components of the delivery system are required.

Accordingly, there is a need in this area for an efficient and effective system and attendant apparatus for overcoming known disadvantages and problems of the type set forth above. Such an improved and proposed system/apparatus should be capable of maintaining the viability of bait fish, within the live well, concurrent to the delivery of a steady flow of ambient water to the live well. Further, in situations involving breakdown or operational failure of one or more components of a delivery system, an effective repair and/or replacement thereof should be accomplished in an efficient manner with a minimal time lost before the system/apparatus is operational.

In more specific terms, a proposed system/apparatus for delivering ambient water to a live bait well may be at least partially modular to the extent of utilizing one or more pumps disposed in fluid communication between the sea chest and the interior of the live well. As such, the one or more water delivery pumps should be capable of being easily replaced and/or repaired via a removable, adjustable interconnection of the one or more pumps with the sea chest.

In cooperation therewith, the sea chest should include structural and operative features which facilitate its continued, and un-interruptive use, in part, by providing the quick and easy access to the interior thereof for purposes of removing any seaweed, seagrass, soil, or other debris, which could foul or restrict water flow from the sea chest to the live well via the water delivery pump.

SUMMARY OF THE INVENTION

The present invention is directed to the supply of a continuous flow of ambient water to a live bait well on a marine craft. As such, the invention may be embodied in a system, assembly and/or apparatus attendant thereto.

In more specific terms, the system and/or assembly of the present invention includes a sea chest mounted on the marine craft and disposed and structured to accomplish a fluid communication with ambient water on which the marine craft travels. Accordingly, the disposition of the sea chest, as well as an ambient water inlet structurally associated therewith, may be below a common or normal water line of the marine craft to further facilitate the intake of water into the interior of the sea chest.

Additional features of the sea chest include an access opening disposed in communicating relation with the interior of the sea chest as well as a cover connected to the sea chest in closing or covering relation to the access opening. In a preferred embodiment, the cover may be movably but fixedly attached to the body of the sea chest so as to eliminate its inadvertent loss or separation. Such a fixed but removable attachment between the cover in the sea chest may be accomplished by a latch assembly which allows the cover to be disposed between an open and closed orientation while restricting of preventing separation of the cover from the remainder of the sea chest.

These operative features of the cover allow for quick and easy access to the interior of the sea chest for purposes of removing any debris accumulated on the interior thereof. Also, during operation the interior of the sea chest will be subject to a static pressure created, at least in part, by an inflow of ambient water from the exterior the marine craft to the interior of the sea chest. Such a static pressurized state facilitates an efficient flow of ambient water from the interior of the sea chest to the live bait well, as will be explained in greater detail hereinafter.

In structural cooperation therewith, the cover is secured in fluid sealing engagement to the access opening, such as by being disposed in fluid sealing engagement with the periphery of the access opening. Moreover, the static pressure within the interior of the sea chest should be maintained during travel of the marine craft in order to assure the continuous flow of ambient water to the live well. Therefore, the sea chest further includes a latch assembly including one or more latches each of which are structured to assume a locked orientation.

The locked orientation is such as to maintain and removably "lock" the cover in sealing engagement with the access opening, even during high-speed travel of the marine craft. As is recognized, such high-speed travel or even travel of the marine craft at reduced or normal speeds produces a vibration through the watercraft. Such a vibration frequently extends to many of the operative structural components or apparatus mounted on the marine craft. Therefore, the aforementioned locked orientation of the one or more latches, defining the latch assembly, is such as to maintain and secure the cover in the aforementioned fluid sealing engagement with the exposed, correspondingly positioned periphery of the access opening, especially during periods of typical or excessive vibration, such as the marine craft is operational or moving.

Other features associated with the sea chest includes a reinforced construction associated with at least the cover and possibly the other sides and bottom segments of the sea chest. By way of example, such reinforced construction may take the form of a high strength honeycombed segment or structure integrated into cover, side, bottom or other appropriate and intended portions of the sea chest. The honeycombed segment or structure may be formed from a rigid, metallic or other high strength material and serves to reinforce the overall structural integrity of the sea chest body. Such reinforced construction serves to overcome one or more forces, which may be placed on the various segments of the sea chest. Moreover, a variety of forces may result from, but not be limited to, the sea chest being continuously subjected to interior static pressure, vibration or other operative features present during operation and travel of marine craft.

The assembly of the present invention further includes modular capabilities or characteristics through the inclusion of one or more pumps each removably connected to the exterior of the sea chest in fluid communication with the interior thereof. Each of the one or more pumps includes a pump housing having an inlet adjustably and removably connected to an outlet of the sea chest. As such, the outlet of the sea chest is disposed at a lowermost, substantially continuously submerged location such that the inlet of each of the one or more pump housings is disposed in direct fluid communication with a submerged, lower interior portion of the sea chest. Such operative disposition eliminates or significantly reduces the possibility of "air lock" in the one or more pumps, due to the fact that the path of fluid flow within the pump and sea chest will not be exposed to air.

The versatility of the modular assembly, including the removable attachment of the one or more pumps in direct fluid communication with the interior of the sea chest, is at least partially established by a mounting structure serving to adjustably connect the inlet of each of the one or more pumps to a different outlet of the sea chest. Such adjustable mounting structure facilitates the attachment of the pump in different orientations, thereby accommodating any close quarter or limited area installations. Also, the aforementioned mounting structure may include, be connected to or otherwise be operatively associated with a valving structure facilitating fluid flow between the interior of the sea chest and the interior of the pump, through the aforementioned pump inlet and sea chest outlet.

Therefore, each of the one or more pumps includes an inlet and an outlet where in the inlet is connected in sealing, fluid communicating relation to the lower, submerged interior of the sea chest. In cooperation therewith, the outlet of each of the one or more pumps is disposed in fluid delivering relation to the interior of the live well. As such, the inlet and the outlet of the pump housing of each of the one or more pumps individually and collectively define at least a portion of a path of fluid flow of the water from the interior of the sea chest to the live well.

Further, each housing of the one or more pumps includes an open segment disposed in accessible relation to an interior thereof and to the internal workings of the pump contained therein. The internal workings of each of the plurality of pumps may include, but not be limited to, a pump motor, impellers, valving, all of which are collectively or independently removable from the interior of the respective pump housing through the aforementioned open segment. As a result repair or replacement of the interior workings of the pump may be accomplished efficiently and quickly, thereby significantly reducing the possibility of the water delivery system to be inoperative for an extended period. Further, in order to at least partially protect the interior workings, each housing of the one or more pumps includes a closure removably disposed in enclosing, covering relation to the open segment and the interior of each of the pump housings.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
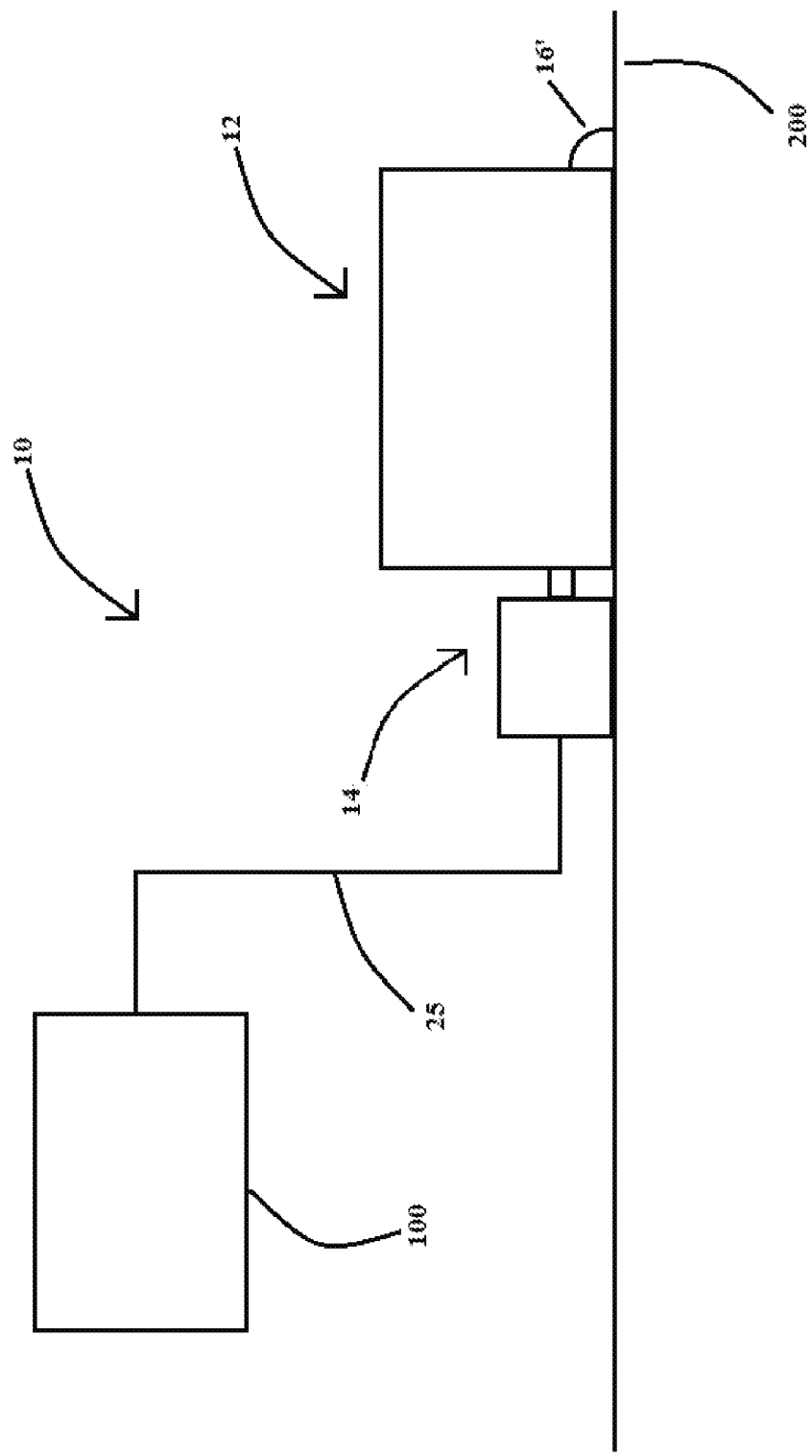
FIG. 1 is a schematic representation of the assembly of the present invention operatively mounted on a marine craft.

As represented throughout the accompanying Figures, the present disclosure is directed towards an assembly, system and/or attendant method, generally indicated as 10, for delivering a continuous flow of ambient water to a live well 100 located on a marine craft 200, as schematically represented in FIG. 1. Further, the structural and operative components of the assembly 10 include modular characteristics through the inclusion of a sea chest 12 and one or more pumps 14 removably and adjustably connected to the sea chest 12, preferably on an exterior thereof. As further represented in FIG. 1, the sea chest 12 may be mounted on the marine craft 200 in fluid communication with ambient water over which the marine craft 200 travels. Further, both the sea chest 12 and the one or more pumps 14 are operatively connected in fluid communication with one another and are collectively located below the normal water line of the marine craft 200, in order to facilitate intake of ambient water.

As such, the sea chest 12 includes one or more water inlets 16 through which ambient water passes into the interior thereof. The water inlets 16 may be disposed and structured to communicate directly with the surrounding, ambient water of the marine craft 200 by virtue of one or more conduits 16'. Accordingly, at least one conduit 16' is disposed in fluid communication between the interior of the sea chest 12, by virtue of connection with a correspondingly disposed water inlet 16, and an exterior of the marine craft 200. Moreover, the at least one conduit 16' may be exposed directly to the ambient water through an integrated inlet formed in the hull of the marine craft. The integrated inlet or other integrated structure (not shown for purposes of clarity) may be formed in the hull of the marine craft 200. In the alternative, cooperative structural features of the marine craft 200 and the sea chest 12 may facilitate a more integrated connection by disposing the sea chest 12 in direct communication with the ambient water through an opening or inlet formed in the hull portion of the marine craft 200.

With primary reference to FIGS. 2A-7, additional structural and operative features of the sea chest 12 include a cover 18 disposed in covering, closing relation to an access opening 12' and the interior of the sea chest 12. As such, the cover 18 is disposable between an open orientation (not shown) and a closed orientation by virtue of a movable connection/attachment such as, but not limited to, a latch assembly 20. Therefore, the cover 18 may be selectively opened to access the interior of the sea chest 12 or be disposed in the closed orientation as represented.

Advantages of the latch assembly 20 include, but are not intended to be limited to, the maintaining of the cover 18 in attachment with the remainder of the sea chest 12, while allowing quick and easy access to the interior thereof, as indicated. As also noted herein, excessive downtime of the water delivery assembly 10 could potentially be disadvantageous in terms of maintaining the viability of the bait in the live well 100. Therefore, quick access to the interior the sea chest 12, by selectively disposing the cover 18 in the open orientation, facilitates the removal of any debris collected therein such as, but not limited to, seaweed, seagrass, etc. In turn, the removal of such potentially damaging debris significantly reduces the possibility of one or more pumps 14 being clogged and rendered in operative.

Further, the sea chest 12 including the latch assembly 20 includes at least one, but preferably a plurality of latches 22, serving to attach and maintain the cover 18 in its closed orientation and into a removably "locked" position, in fluid sealing engagement with an access opening 12' of the sea chest 12. Therefore, each of the one or more latches 22 are structured to include a "locked orientation" thereby removably locking the cover 18 in its closed, fluid sealing engagement with the access opening 12' during travel and/or operation of the marine craft 200.

Moreover, the locked orientation of the one or more latches 22 maintain and removably "lock" cover 18 in fluid sealing engagement with the access opening 12', even during high-speed travel of the marine craft. As will be explained in greater detail hereinafter, maintaining a fluid sealing engagement of the cover 18 with the access opening 12' of the sea chest 12 is an advantageous factor in the operation of the water delivering assembly 10 of the present invention, in order to maintain a flow of ambient water to the live well 100, which in turn maintains the viability of the live bait contained therein.

As is recognized, operation of the marine craft 200 including, but not limited to, high-speed travel or even travel of the marine craft 200 at normal or reduced speeds may produce a vibration throughout much of the marine craft 200. Also, such vibration frequently extends to many of the operative and structural components or apparatus mounted on the marine craft 200, including the sea chest 12. Therefore, the aforementioned locked orientation of the one or more latches 22, serves to removably "lock" the cover 18 in the closed orientation, which in turn maintains and secures the cover 18 in the aforementioned fluid sealing engagement with the correspondingly positioned periphery of the access opening 12', especially during periods of typical or excessive vibration, while the marine craft 200 is operating.

Figure 5:
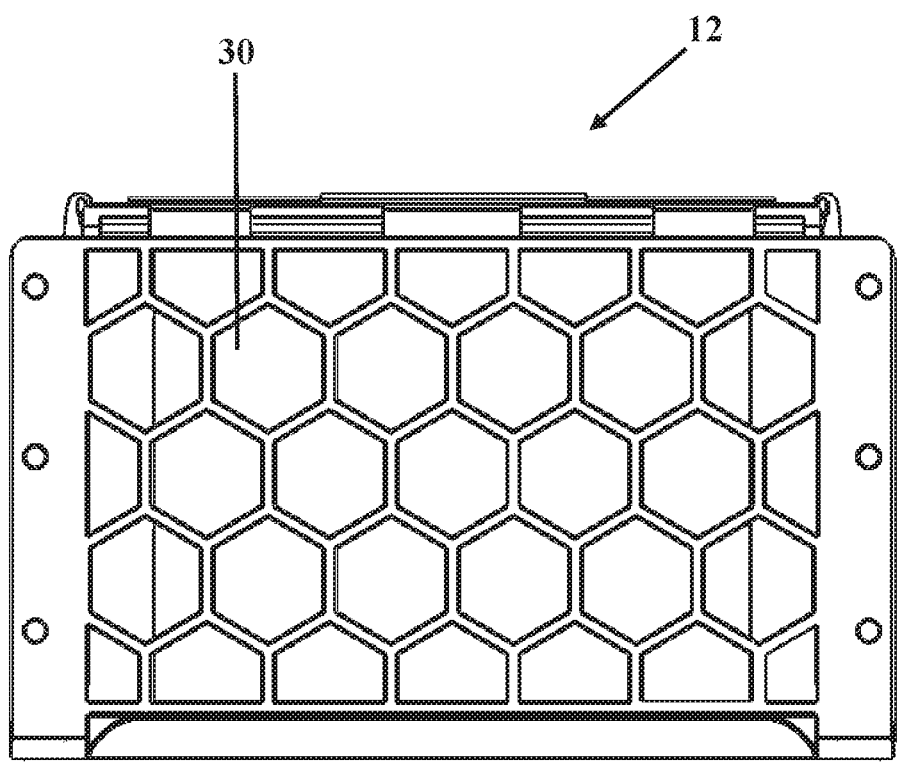
FIG. 5 is a plan view of a reinforcing construction of at least a cover, side and/or bottom portion of a body of the sea chest of the embodiments of FIGS. 2A,2B-4A,4B.
Figure 6:
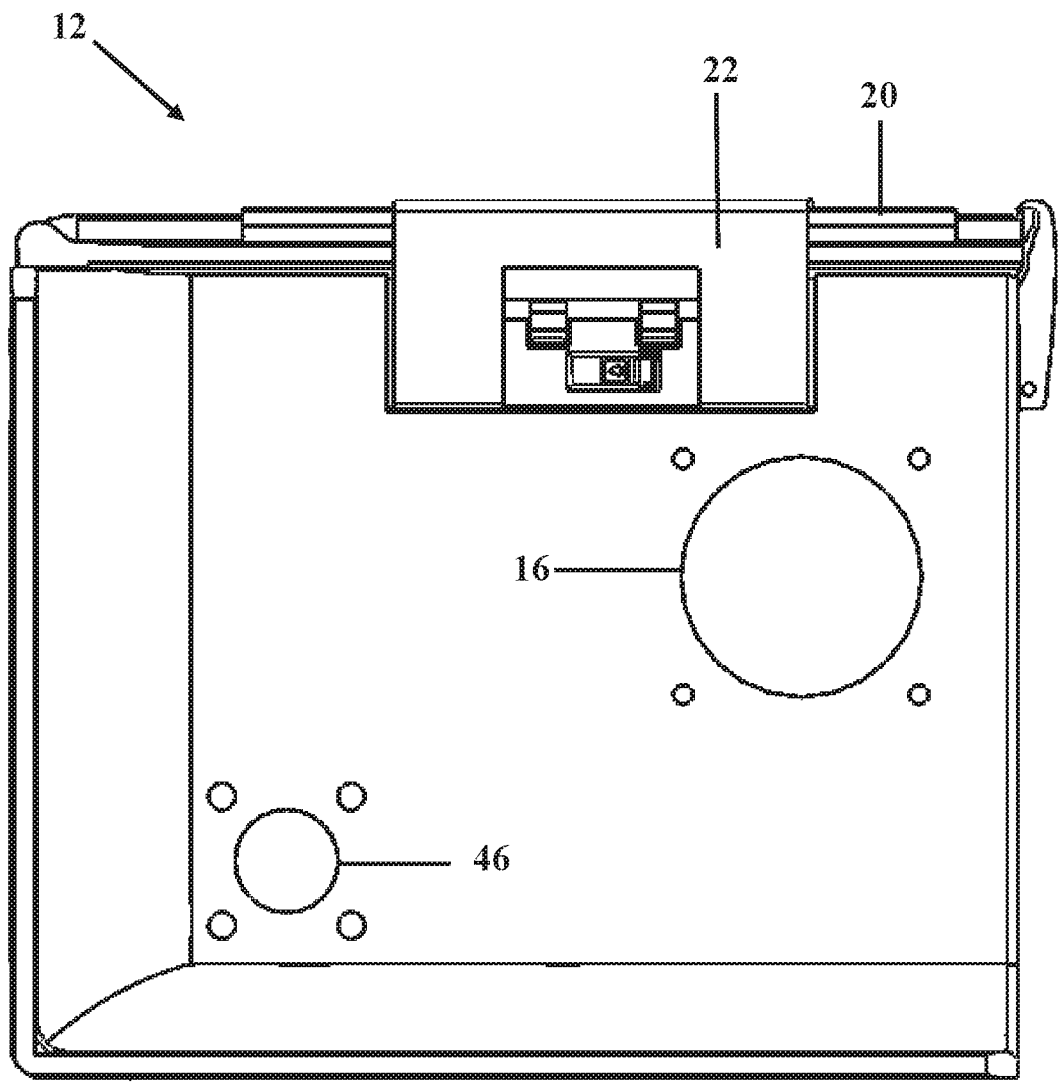
FIG. 6 is an end view of one or more embodiments of the body of the sea chest of the present invention.

Additional structural features of the sea chest 12 are represented in FIG. 5 and comprise a reinforcing construction generally indicated as 30. More specifically, the reinforcing construction 30 preferably includes a honeycomb structure integrated within different portions and/or segments of the sea chest 12. As such, the honeycomb structure defining the reinforcing structure 30 may be physically located in an exposed area or alternatively integrated in a layered-type format within the interior of the bottom, sidewalls and specifically, but not exclusively, the cover 18. Moreover, the honeycomb structure may be formed of a metallic or other high strength material and resist any forces exerted on the sea chest either externally or internally. As will be explained in greater detail hereinafter, the interior of the sea chest is maintained under a substantially static pressure due to the activation/operation of the one or more pumps 14 drawing water through and from the interior of the sea chest 12. The maintenance of such an internal pressure is at least partially facilitated by the establishment and maintenance of the cover 18 being disposed in fluid sealing engagement with the corresponding peripheral portions of the access opening 12'.

Figure 7:
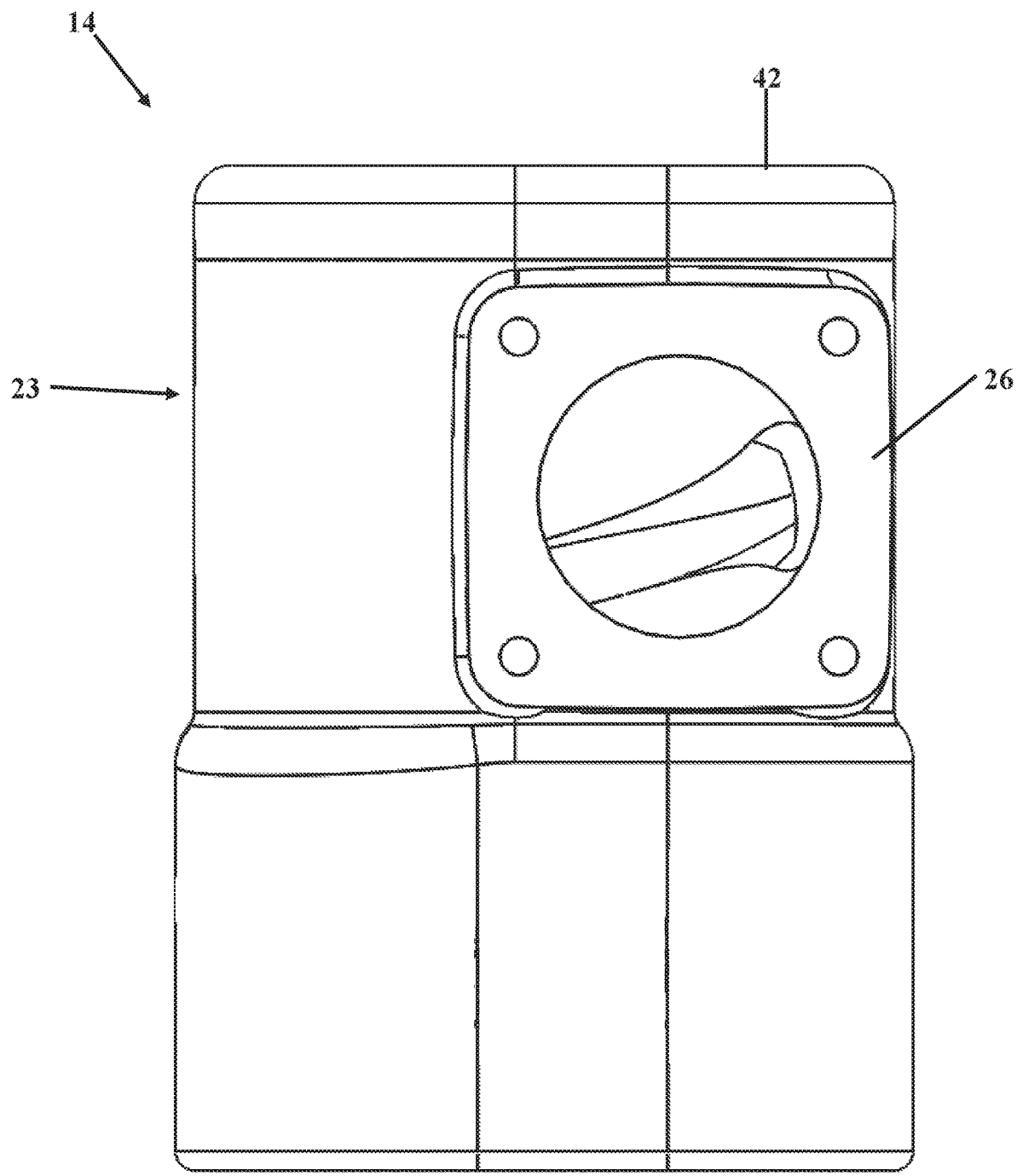
FIG. 7 is a front elevation of one embodiment of one or more pumps attachable to and used in combination with a sea chest of the present invention.
Figure 8:
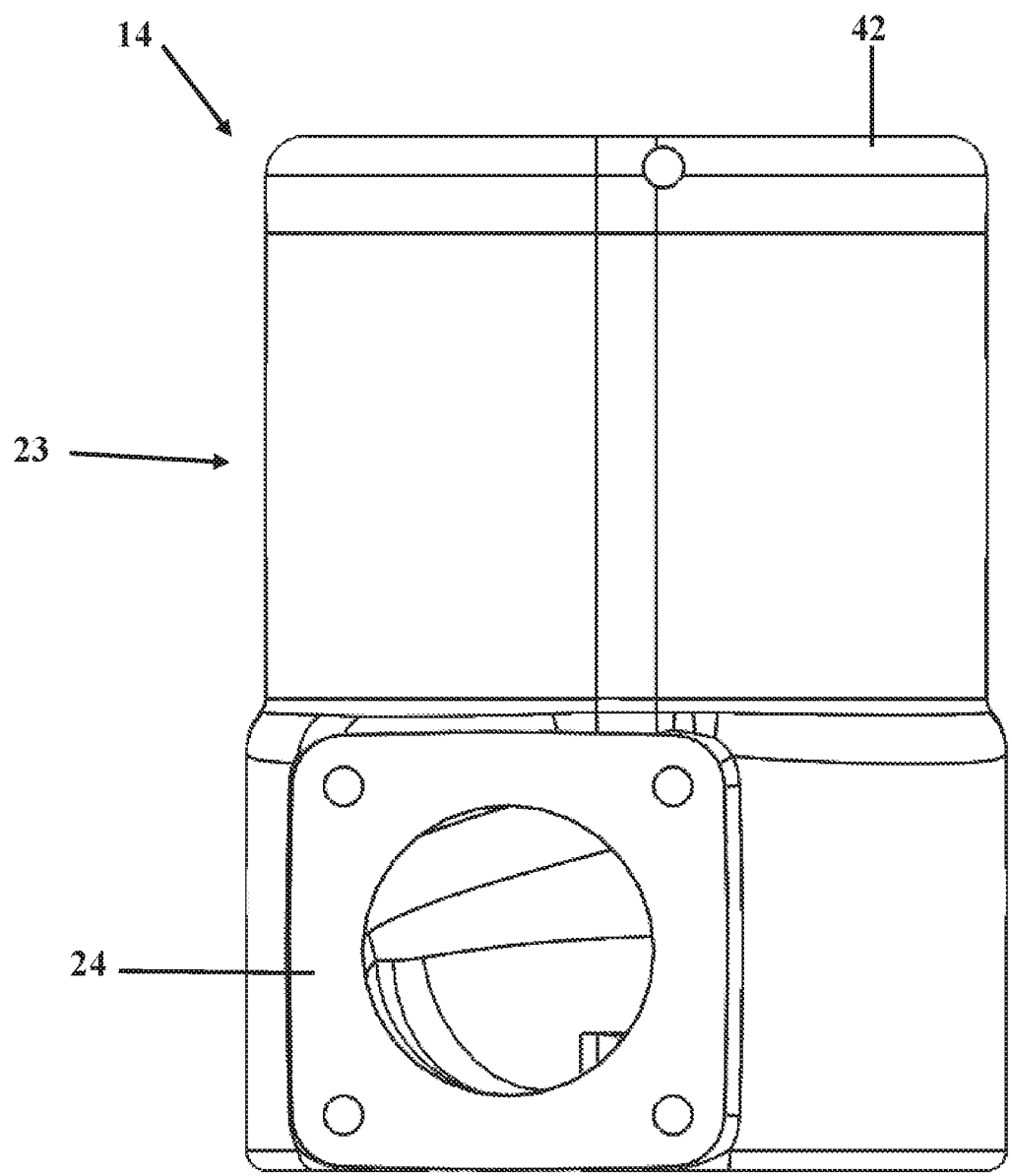
FIG. 8 is a rear elevation of the embodiment of FIG. 7.
Figure 9:
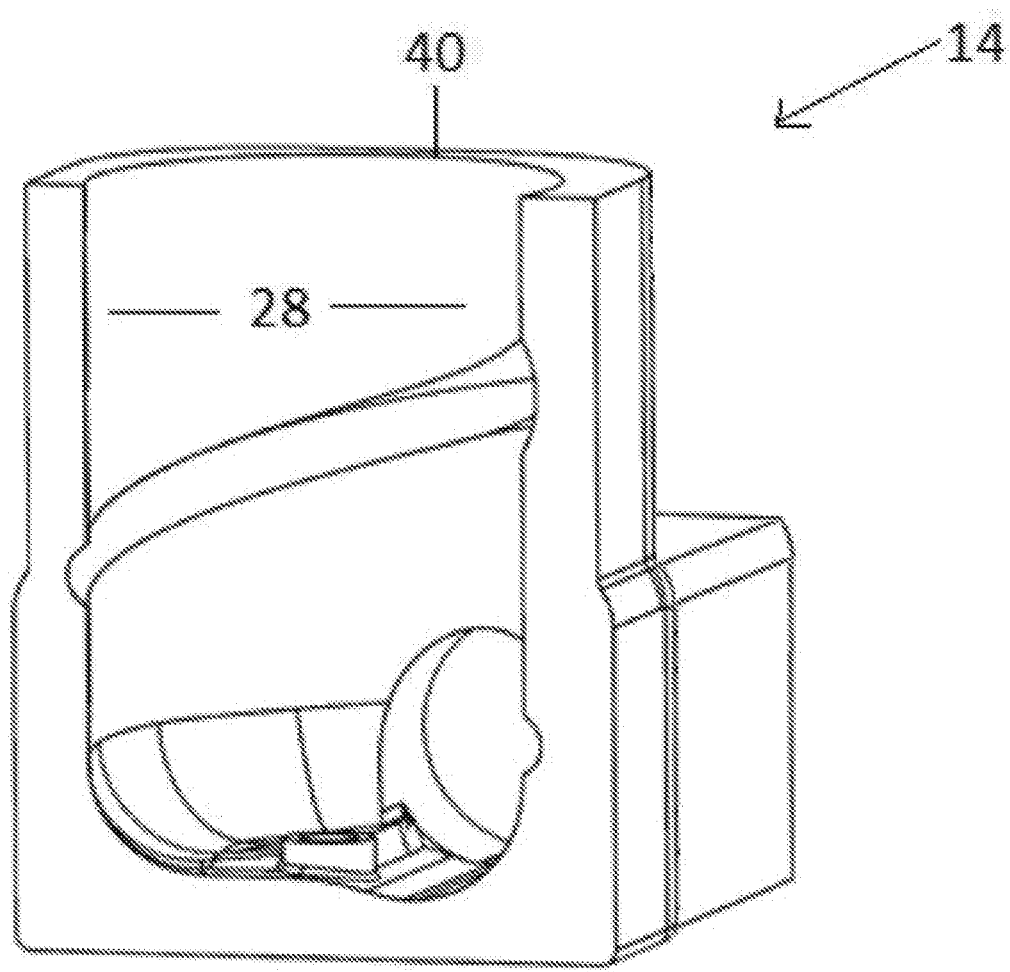
FIG. 9 is an interior perspective view of one or more pumps as represented in FIGS. 7-8.
Figure 10:
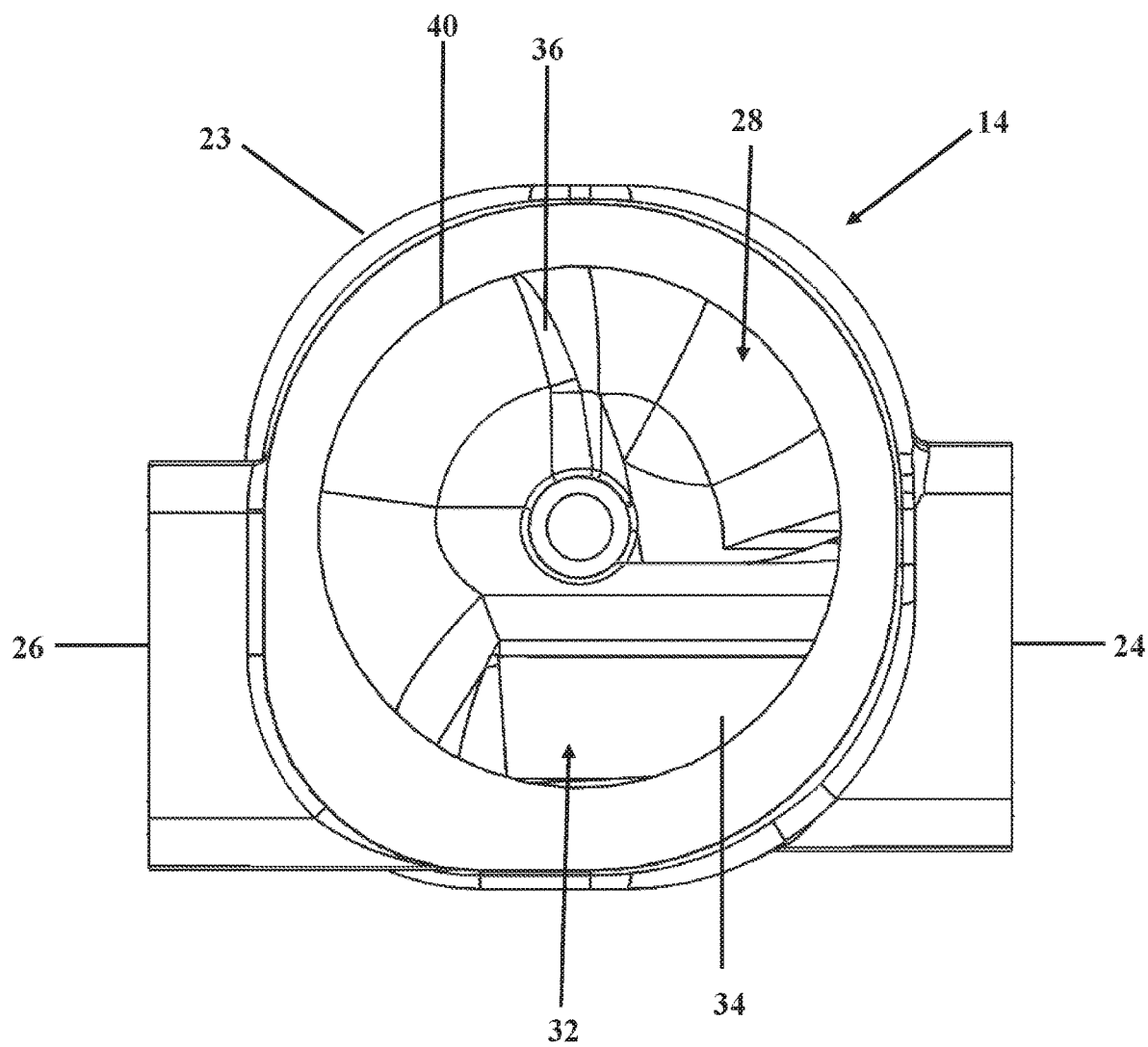
FIG. 10 is a top interior view of the embodiment of one or more pumps as represented in FIGS. 7-9.

As set forth herein, as represented in FIGS. 1, 7 and 8, a flow of ambient water delivered to the live well 100 is accomplished by the interconnection of at least one but in certain practical applications a plurality of pumps 14 to the sea chest 12. Further, at least one embodiment of the assembly 10 of the present invention includes the one or more pumps 14 being connected on an exterior of the sea chest 12 in direct fluid communication with the interior thereof. In more specific terms, each of the one or more pumps 14 includes a water pump inlet 24 and a water pump outlet 26. The water pump inlet 24 and water pump outlet 26 at least partially and collectively define a path of fluid flow of water from the interior of the sea chest 12 to the interior of the live well 100.

In more specific terms, an appropriate conduit 16' may serve to connect the one or more pumps 14 to the interior of the live well 100. Further, with primary reference to FIGS. 7-13 each of the one or more pumps 14 includes a pump housing 23 including the aforementioned water inlet 24 and water pump outlet 26, both communicating with the interior 28 of the pump housing 23. When a plurality of pumps 14 are used to create a forced flow of water from the interior of the sea chest 12 to the interior of the live well 100, the aforementioned path of fluid flow may also be at least partially defined by a common conduit or different conduits, collectively and schematically represented in FIG. 1 as 25.

With primary reference to FIGS. 7-13 each of the plurality of one or more pumps 14 includes an at least partially hollow interior 28 structured to facilitate the passage of water flow there through from the inlet 24 to the pump outlet 26. Moreover, as represented in at least FIG. 10 the interior 28 of the pump housing 23 is dimensioned and configured to include "interior workings" 32 which may include a pump motor 34 and/or and impeller or fluid driving components 36, as well as other structure operatively associated with the pump motor 34 and or fluid driving components 36.

Figure 11:
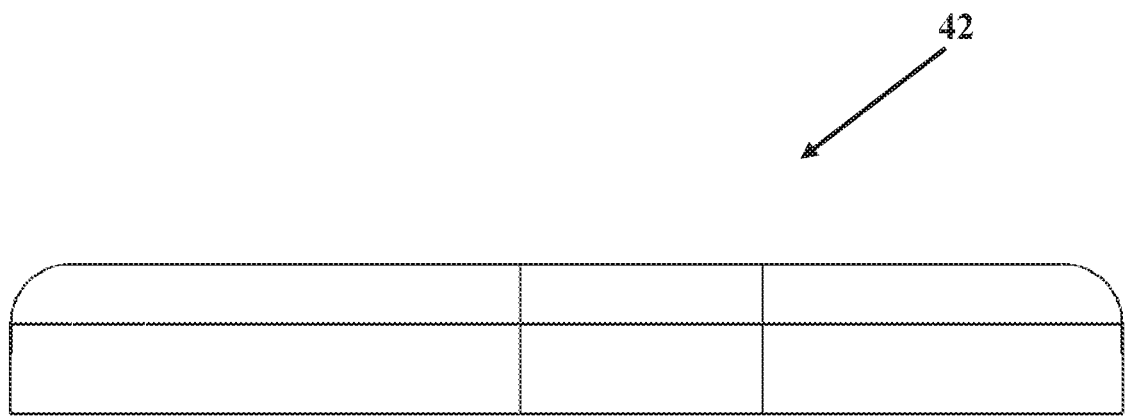
FIG. 11 is a transverse sectional view of a closure operatively associated with the one or more pumps as represented in the embodiment of FIGS. 7-10.
Figure 12:
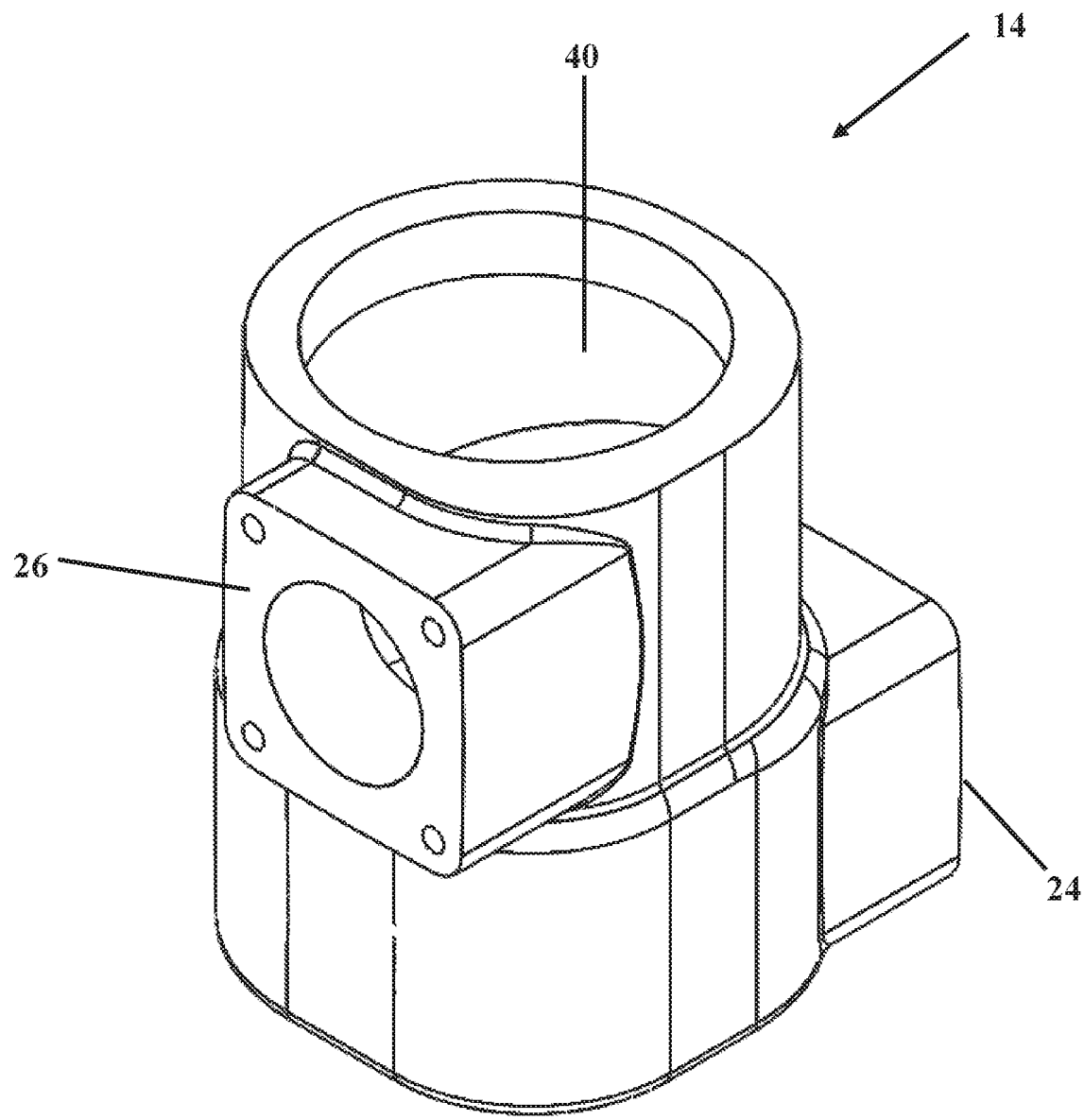
FIG. 12 is a top perspective view of the embodiment of FIGS. 7-10 with the closure of the embodiment of FIG. 11 removed and the interior of the one or more pumps exposed.

As represented in FIGS. 7-12, the pump housing 23 includes an open segment defined by access opening 40 disposed in direct communication with the interior 28. In addition a closure generally indicated as 42 in FIG. 11 is dimensioned and configured to be removably disposed in covering, closing relation to the access opening 40. The ability to remove the cover 42 allows quick and easy access to the interior of the pump housing 23 thereby enabling repair, removal and/or replacement of the interior workings 32 including, but not limited to the pump motor 34, the fluid driving components 36 and any structure operatively associated therewith. As noted above, this feature of quick and easy access to the interior 28 of the pump housing 23 allows for quick repair or replacement of each of the one or more pumps 14 in order to maintain the operability of the assembly and eliminate or significantly reduce downtime. As also previously indicated excessive downtime threatens the viability of the bait within the live well 100.

Figure 2A:
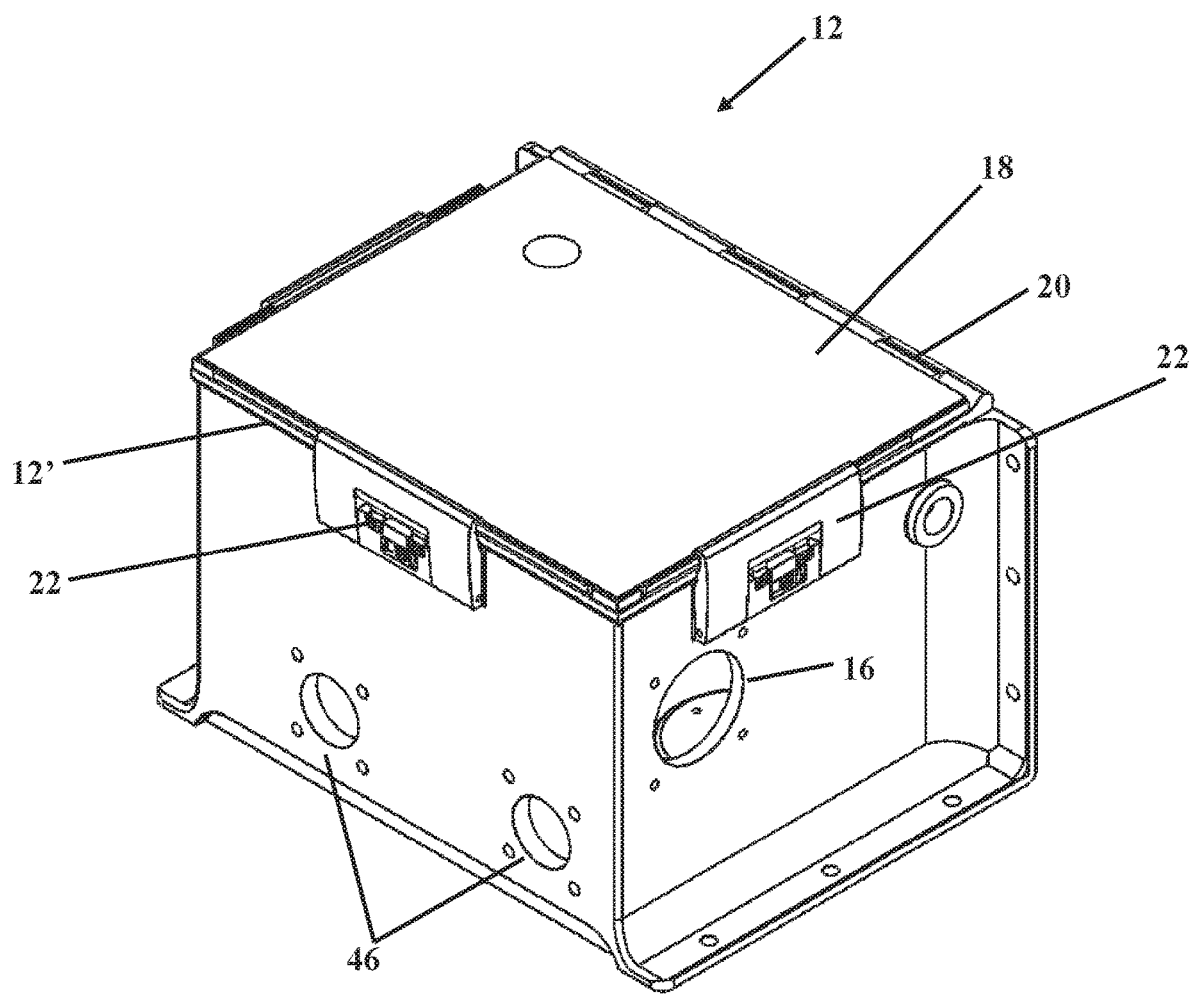
FIG. 2A is a front perspective view of one embodiment of a sea chest component of the assembly of the present invention.
Figure 2B:
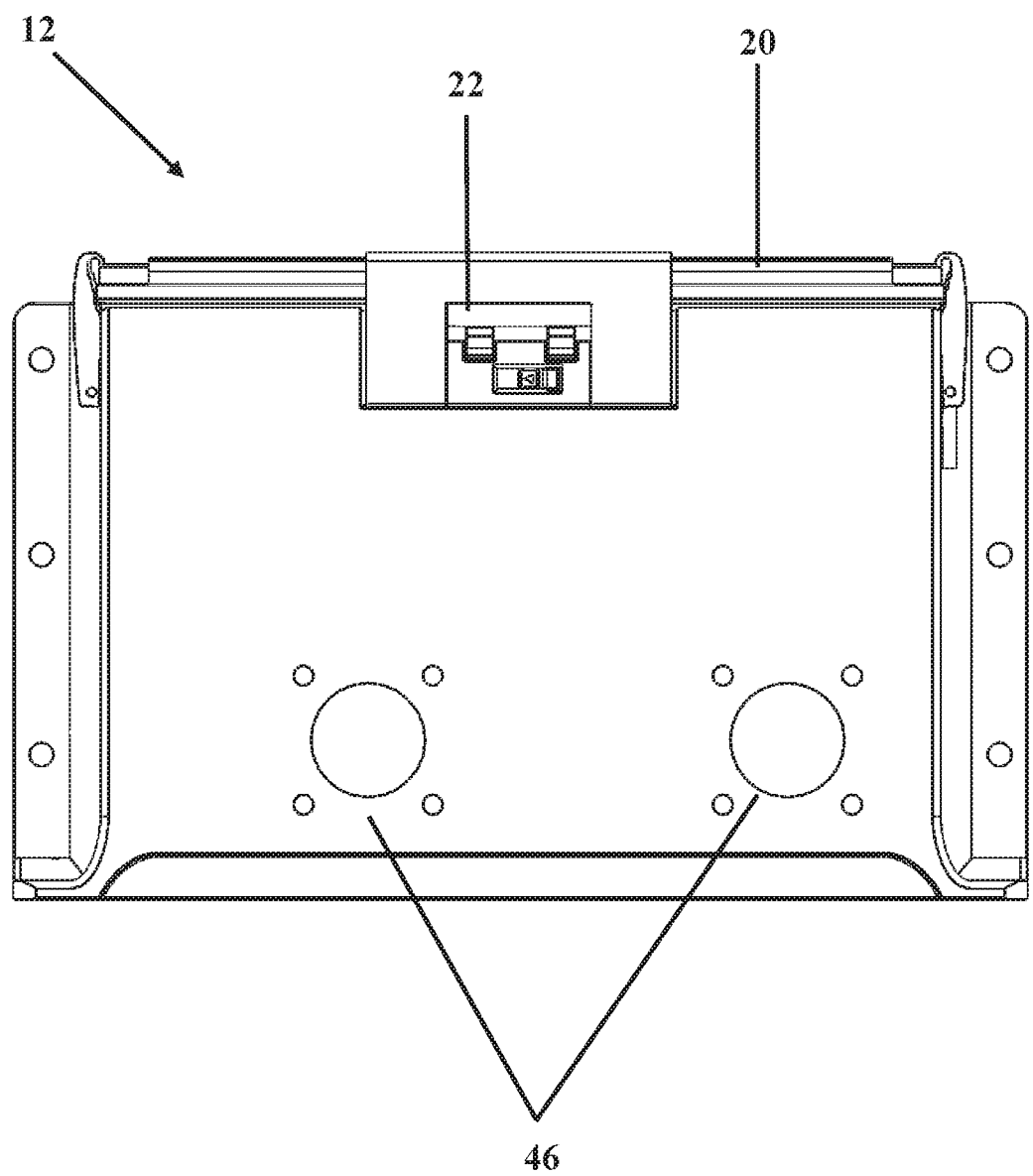
FIG. 2B is a front elevation of the embodiment of FIG. 2A.
Figure 3A:
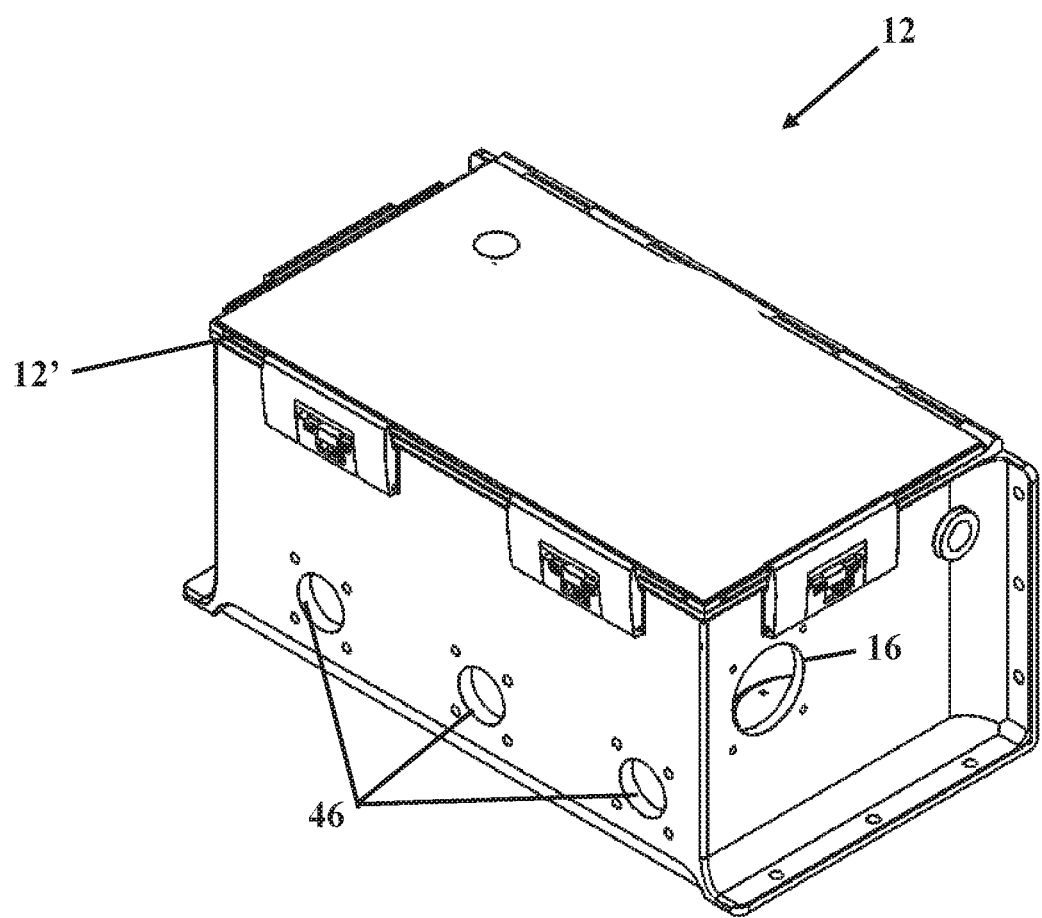
FIG. 3A is a front perspective view of another embodiment of a sea chest component of the assembly of the present invention.
Figure 3B:
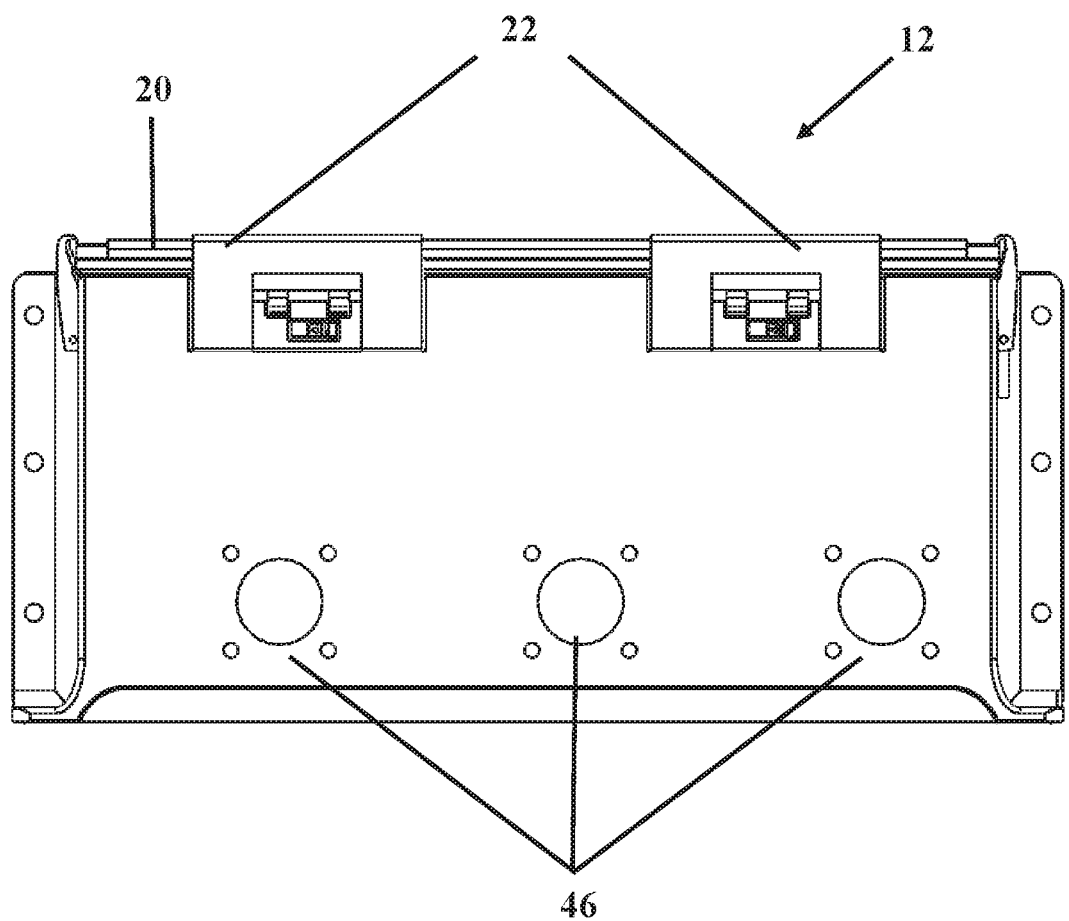
FIG. 3B is a front elevation of the embodiment of FIG. 3A.
Figure 4A:
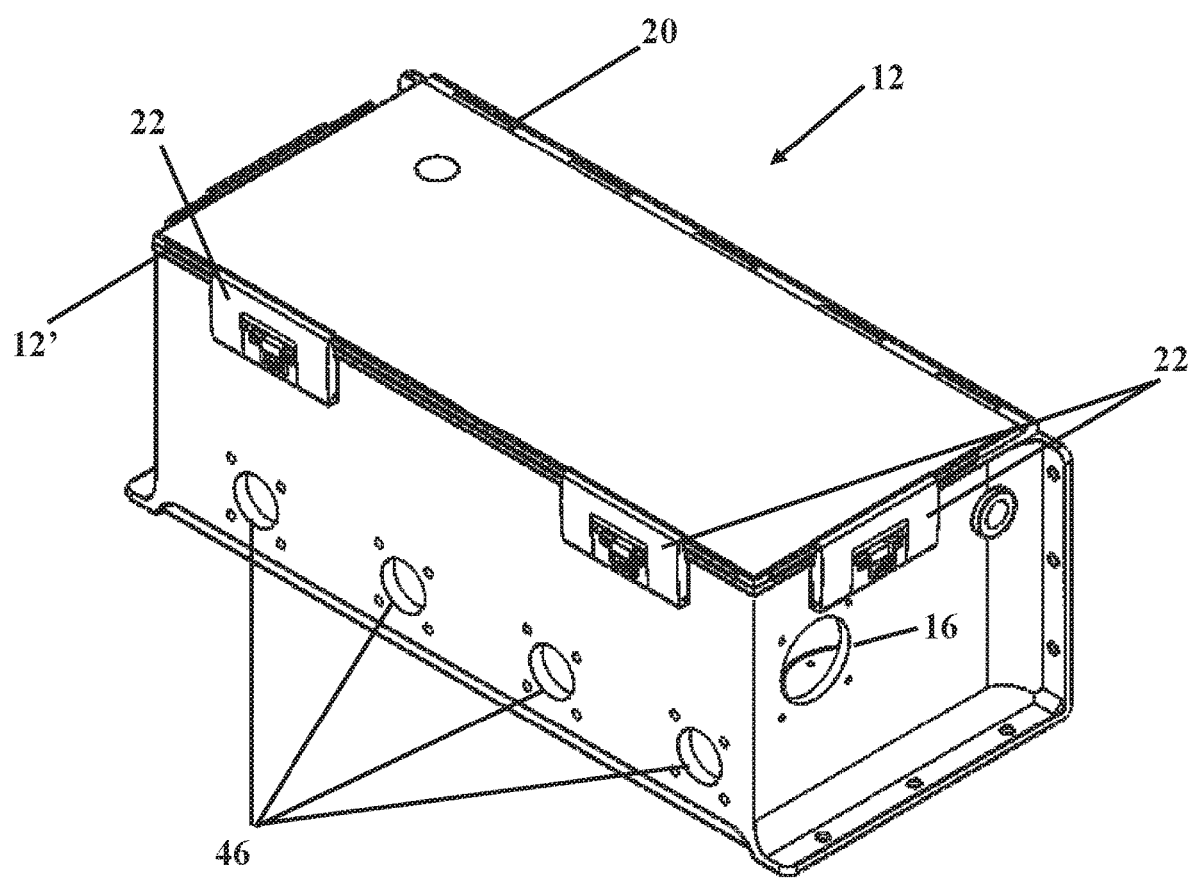
FIG. 4A is a front perspective view of another embodiment of a sea chest component of the assembly of the present invention.
Figure 4B:
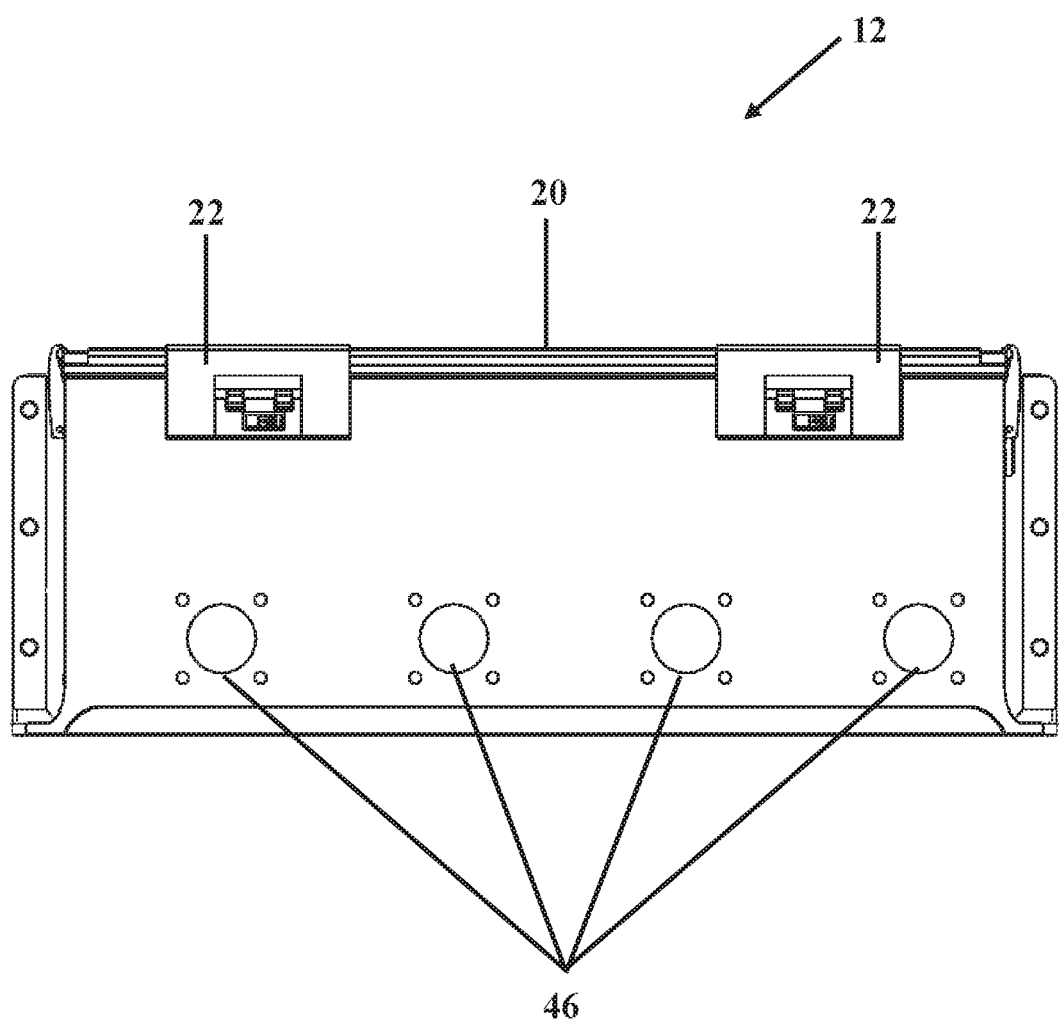
FIG. 4B is an elevation of the embodiment of FIG. 4A.

As indicated one or more pumps 14 are removably and adjustably connected to the exterior of the sea chest 12. As represented in FIGS. 2A-4B and 13, the sea chest has at least one but preferably a plurality of water outlets 46 equal in number to that of the plurality of pumps 14 connected to the sea chest 12. The versatility of the sea chest 12 is represented in FIGS. 2A, 2B; 3A, 3B and 4A, 4B, where in the sea chest 12 includes a different number of water outlets 46. As such, it should be apparent that the sea chest 12 represented in these figures is structurally adapted to have an equal number of pumps 14 removably attached to the exterior thereof. Further, as represented in at least FIG. 6, the sea chest 12 may include only a single water outlet 46 disposed and structured to connect only one of a plurality of pumps 14 in fluid communication with the interior of the corresponding sea chest 12.

It can be further noted that the water inlet 24 of each of the one or more pumps 14 substantially corresponds in dimension, configuration and overall structure to each of the water outlets 46 of the sea chest 12. This allows for an adjustable and removable attachment of the one or more pumps 14 to different ones of the outlets 46. Accordingly, a mounting structure generally indicated as 50 in FIG. 13 comprises the cooperative structuring of the water pump inlet 24 of each of the pumps 14 with different ones of the water outlet 46 of the sea chest 12. Accordingly, each of the pumps 14 may be arranged in different orientations due to the cooperative configuring and dimensioning between the water pump inlet 24 and the water outlet 46. Such a variety of adjustable orientations of each of the pumps may include a substantially vertically upright orientation, an angular sideways orientation and/or a reversed or "upside-down" orientation of each of the pumps 14 to a different one of the outlets 46.

Figure 13:
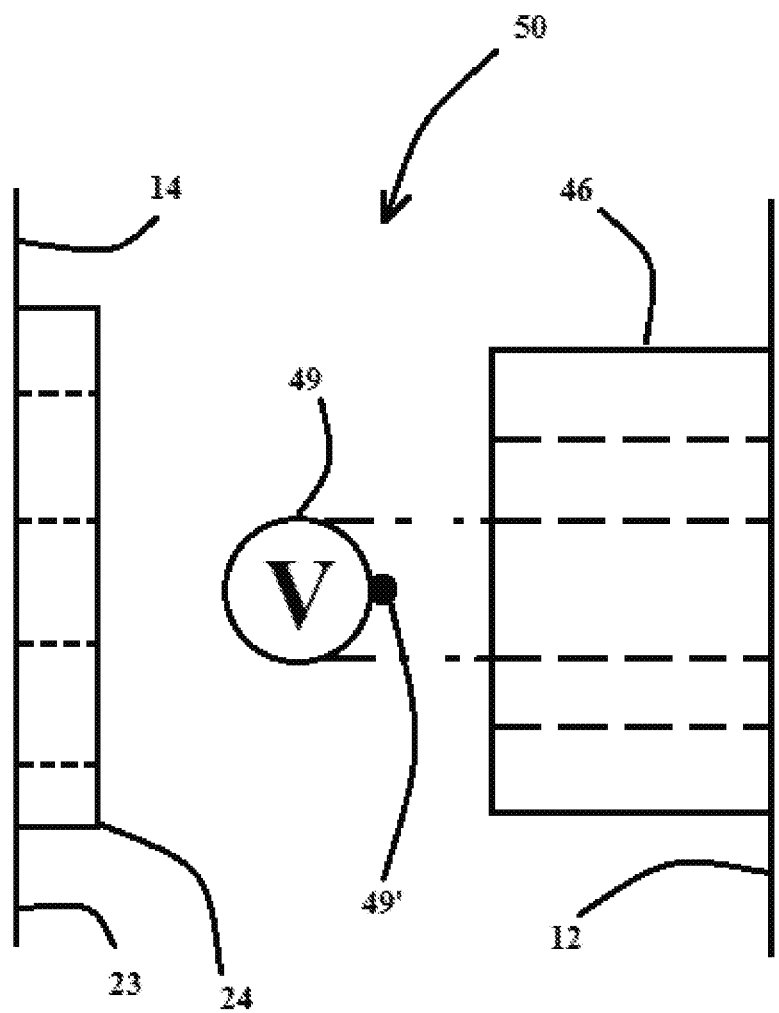
FIG. 13 is a schematic representation, in at least partially exploded form, of one embodiment of an adjustable mounting structure interconnecting each of one or more pumps to the sea chest.

As also represented in FIG. 13 there may be an adjustable and/or movable valve structure 49 disposed in fluid communication between the water outlet 46 and water inlet 24 respectively the sea chest 12 and the one or more pumps 14. As such, the adjustable valve 49 may accommodate the different possible orientations of the one or more pumps 14 as it is secured to the exterior of the sea chest 12. Moreover, the adjustable valve 49 may be located in operative association with the pump outlet 26 as schematically represented and may be manually or otherwise selectively disposed between an open and closed orientations through manipulation of adjustment member 49'. As such, the valve 49 may be closed during repair or replacement of a correspondingly positioned pumps 14 thereby preventing water flow there through. Upon completion of repair or replacement of the corresponding pumps 14, the valve 49 may be opened so as to permit water flow from the interior of the sea chest 12 to the interior of the pump 14.

Yet another feature of the water delivery system and attendant apparatus of the present invention is a recognition that the speed of the marine craft 200 and vary. Therefore, during high-speed operation of the marine craft 200, control circuitry (not shown) may be manually or automatically operated to increase the speed and/or operation of the one or more pumps 14, thereby maintaining an adequate flow of water through the sea chest 12 and one or more pumps 14 and to the live well 100.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An assembly for delivering water to a live well on a marine craft, said assembly comprising:
   a sea chest mounted on the marine craft and disposed in fluid communication with ambient water and the live well,
   an access opening formed on said sea chest in communicating relation to an interior thereof,
   a cover connected to said sea chest in covering relation to said access opening, said cover disposable between an open orientation and a closed orientation, said closed orientation comprising said cover disposed in fluid sealing engagement with said access opening, concurrent to said cover being in said covering relation, at least one pump disposed exteriorly of said sea chest and at least partially defining a path of fluid flow from said sea chest to the live well, and said sea chest maintained under a substantially static internal pressure concurrent to said fluid sealing engagement of said cover with said access opening and activation of said at least one pump.

2. The assembly as recited in claim 1 further comprising a latch assembly, including a locking orientation, disposed and structured to maintain said cover in said fluid sealing engagement with said access opening concurrent to said closed orientation and operation of the marine craft.

3. The assembly as recited in claim 1 further comprising a reinforcing construction integrated in said cover and structured to enhance structural integrity of said cover concurrent to said fluid sealing engagement with said access opening.

4. The assembly as recited in claim 3 wherein said reinforcing construction comprises a honeycomb segment integrated in said cover.

5. The assembly as recited in claim 1 further comprising a mounting structure adjustably connecting said at least one pump, in different orientations, to an exterior of said sea chest and in fluid communication with an interior of said sea chest.

6. The assembly as recited in claim 5 wherein said at least one pump includes a housing having an open segment disposed in accessible relation to an interior of said housing and to internal workings of said at least one pump.

7. The assembly as recited in claim 6 wherein said housing includes a closure removably disposed in enclosing relation to said open segment and said interior of said housing.

8. The assembly as recited in claim 6 wherein said internal workings include a pump motor mounted within said housing, said open segment and said pump motor cooperatively dimensioned and configured for removal of said pump motor from said housing through said open segment.

9. The assembly as recited in claim 6 wherein said housing comprises a pump inlet and a pump outlet; said pump inlet exteriorly connected in fluid receiving relation to a lower, submerged interior of said sea chest.

10. The assembly as recited in claim 9 wherein said pump outlet is disposed in fluid delivering relation to the live well; said pump inlet and said pump outlet of said housing collectively and at least partially defining said path of fluid flow, exteriorly of said sea chest.

11. An assembly for delivering water to a live well on a marine craft, said assembly comprising:

a sea chest mounted on the marine craft and disposed in fluid communication with ambient water and the live well, an access opening formed on said sea chest in communicating relation to an interior thereof, a cover removably connected in covering, fluid sealing relation to said access opening, at least one pump disposed exteriorly of said sea chest and including a housing connected to an exterior of said sea chest; said at least one pump at least partially defining a path of fluid flow from said sea chest to the live well, a substantially static internal pressure maintained within said sea chest, concurrent to said fluid sealing engagement of said cover with said access opening and activation of said at least one pump, said housing having an open segment disposed in accessible relation to an interior of said housing and to internal workings of said at least one pump.

12. The assembly as recited in claim 11 is further comprising a latch assembly, including a locking orientation; said latch assembly disposed on said sea chest and structured to maintain said cover in said fluid sealing engagement with said access opening concurrent to said closed orientation and operation of the marine craft.

13. The assembly as recited in claim 11 wherein said cover comprises a reinforcing construction, including a honeycomb segment integrated in said cover and structured to enhance structural integrity of said cover concurrent to said fluid sealing engagement with said access opening.

14. The assembly as recited in claim 11 further comprising a mounting structure adjustably connecting said at least one pump in different orientations to and in fluid communication with an interior of said sea chest.

15. The assembly as recited in claim 11 wherein said housing comprises a pump inlet and a pump outlet; said pump inlet exteriorly connected in fluid receiving relation to a lower, submerged interior of said sea chest; said pump outlet disposed in fluid delivering relation to the live well; said pump inlet and said pump outlet of said housing collectively and at least partially defining said path of fluid flow, exteriorly of said sea chest.

16. The assembly as recited in claim 11 further comprising at a plurality of pumps each disposed exteriorly of said sea chest and interconnected between and at least partially defining a path of fluid flow from said sea chest to the live well, exteriorly of said sea chest.

17. The assembly as recited in claim 16 wherein each of said plurality of pumps includes a housing having an open segment disposed in accessible relation to an interior of said housing and to internal workings of said at least one pump.

18. The assembly as recited in claim 17 wherein said internal workings of each of said plurality of pumps include a pump motor mounted within said housing and removable therefrom through said open segment.

19. The assembly as recited in claim 17 wherein said housing of each of said plurality of pumps comprises a pump inlet and a pump outlet; said pump inlet exteriorly connected in fluid receiving relation to a lower, submerged interior of said sea chest; said pump outlet disposed in fluid delivering relation to the live well; said pump inlet and said pump outlet of said housing collectively and at least partially defining said path of fluid flow, exteriorly of said sea chest.

20. The assembly as recited in claim 17 wherein said housing of each of said plurality of pumps includes a closure removably disposed in closing relation to said open segment and said interior of said housing.

* * * * *